June 14, 1949.  F. H. BOGART  2,473,133
MACHINE TOOL

Filed Dec. 11, 1946  3 Sheets-Sheet 1

INVENTOR.
FRED H. BOGART
BY
Kwis, Hudson, Boughton & Williams
ATTORNEYS

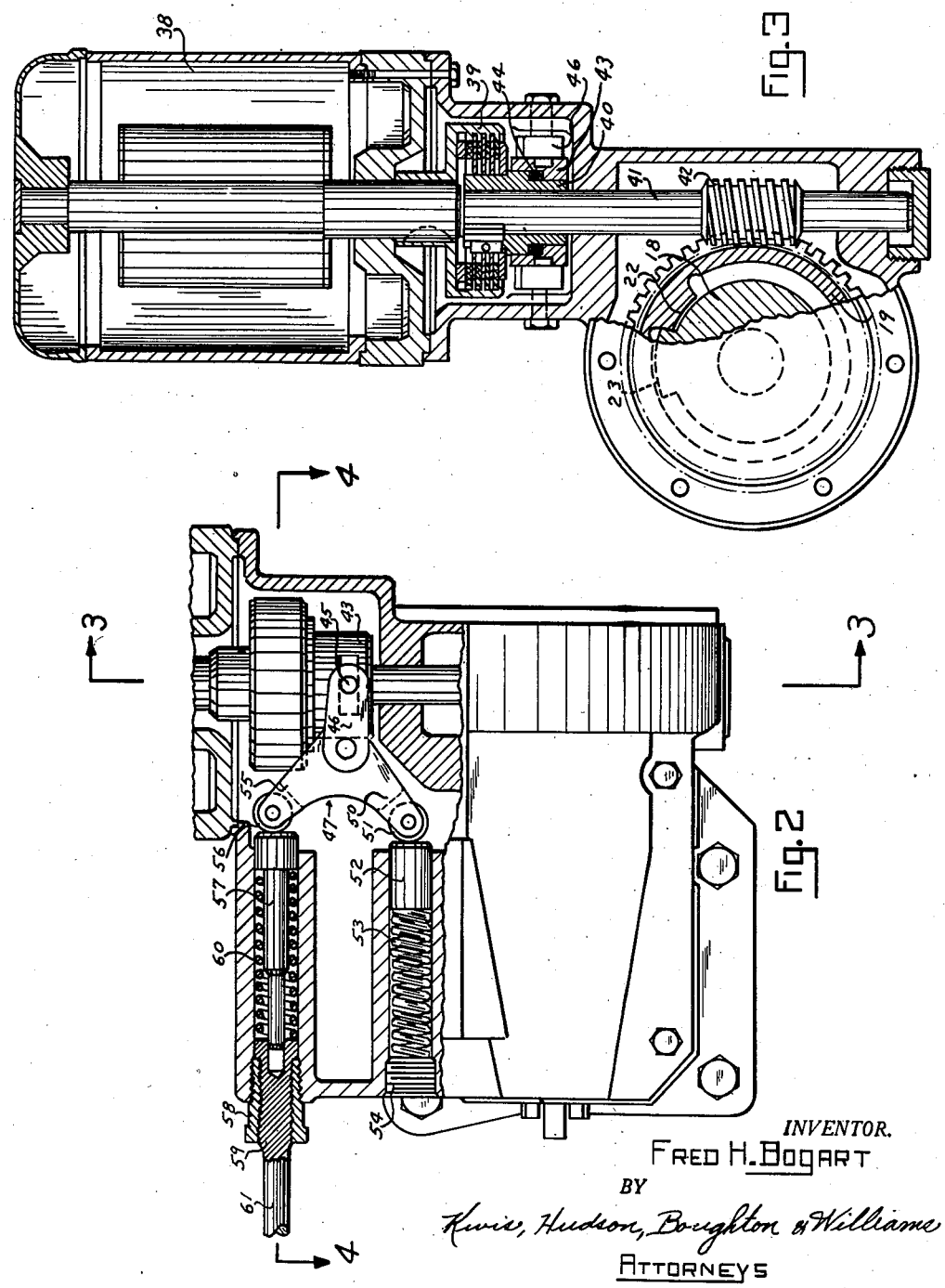

June 14, 1949.  F. H. BOGART  2,473,133
MACHINE TOOL

Filed Dec. 11, 1946  3 Sheets-Sheet 3

INVENTOR.
FRED H. BOGART
BY
Kwis, Hudson, Boughton & Williams
ATTORNEYS

Patented June 14, 1949

2,473,133

UNITED STATES PATENT OFFICE 2,473,133

MACHINE TOOL

Fred H. Bogart, South Euclid, Ohio, assignor to The Warner & Swasey Company, Cleveland, Ohio, a corporation of Ohio Application December 11, 1946, Serial No. 715,356

13 Claims. (Cl. 279—1)

This invention relates to a machine tool and, more particularly, to an improved means for actuating a friction clutch connecting the driving and driven members of machine tools or like devices.

An object of the invention is to provide an improved means for maintaining the disks or other friction members of a friction clutch in engagement under a substantially uniform pressure, even though the said disks or friction members have become worn, so that the clutch is effective to transmit a substantially constant torque throughout the useful life of the friction members.

Another object of the invention is to provide an improved means for maintaining a friction clutch engaged with a substantially constant predetermined pressure, the means being so constructed and arranged as to be adjustable to permit selection of the clutch-engaging pressure and to automatically compensate for wear of the friction members of the clutch.

A further object of the invention is to provide an improved means for employing a spring to maintain a friction clutch in engagement, the means being so constructed and arranged that the wear of the friction members of the clutch, resulting in reduced force of the spring, will not effect the pressure with which the clutch is engaged.

A still further object of the invention is the provision of an improved mechanism for maintaining the friction members of a friction clutch in engagement under substantially uniform pressure, the mechanism including a lever means and a spring acting thereon in a manner such that the decrease in force of the spring, due to wear of the friction members of the clutch, is compensated by an increase in mechanical advantage of the lever means.

A more specific object of the invention is to provide an improved friction clutch for use in machine tools or the like and comprising an improved means for maintaining the friction clutch in engagement under a selected substantially uniform force; the said means comprising a standard or main spring acting through a lever means for effecting engagement of the clutch, and an adjustable reaction spring also acting upon the lever means but in opposition to the standard or main spring to provide a range of clutch-engaging pressures, the springs and lever means being so constructed and arranged as to automatically compensate for wear of the friction members of the clutch so that when adjusted for a selected clutch-engaging pressure, that pressure will be maintained substantially constant.

A still more specific object of the invention is to provide an improved means for maintaining a friction clutch engaged with a substantially constant predetermined pressure, the means including a three-arm pivoted lever with one arm connected to the clutch for engaging the latter, a spring acting upon each of the other arms of the lever, one spring acting in a direction to exert clutch-engaging pressure and the other spring acting in opposition thereto, the last-mentioned spring being provided with means to vary its force whereby the resulting clutch-engaging pressure may be adjusted to a selected value; the lever and springs being so constructed and arranged that when the former rocks about its pivot, due to wear of the friction members of the clutch, the effective values of the lever arms upon which the springs act will respectively increase and decrease as the forces of the corresponding springs respectively decrease and increase, whereby the product of the force of each spring by the corresponding effective lever arm remains substantially constant.

Another object of the invention is to provide a machine tool having a work-gripping means including movable jaws, a wrench spindle for moving said jaws to and from work-gripping position, power driven means, and an operative connection including a friction clutch between the power driven means and the wrench spindle, with an improved means for maintaining the friction clutch engaged under a substantially constant predetermined pressure, the improved means being so constructed and arranged as to automatically compensate for wear of the friction members of the clutch whereby the torque transmitted to said wrench spindle will remain at a substantially constant predetermined value.

An additional object of the invention is to provide a machine tool and an improved friction clutch engaging means of the type defined in the preceding object with means to adjust the clutch-engaging pressure whereby the force for moving the jaws of the work-gripping device may be adjusted to a selected value which will remain substantially constant even though the friction members of the clutch should become worn.

Other and further objects of the invention reside in various features of construction, combination and arrangements of parts as will hereinafter become more clearly apparent from the following detailed description of the present preferred embodiment of the invention, described with reference to the accompanying drawings wherein:

Fig. 2 is a fragmentary view of the power operated chuck wrench unit shown in Fig. 1, the view being partly in elevation and partly in section to reveal an improved clutch engaging mechanism constructed in accordance with this invention;

Fig. 3 is a view, partly in section and partly in end elevation, the section being taken substantially on the line 3—3 of Fig. 2;

Figure 1:
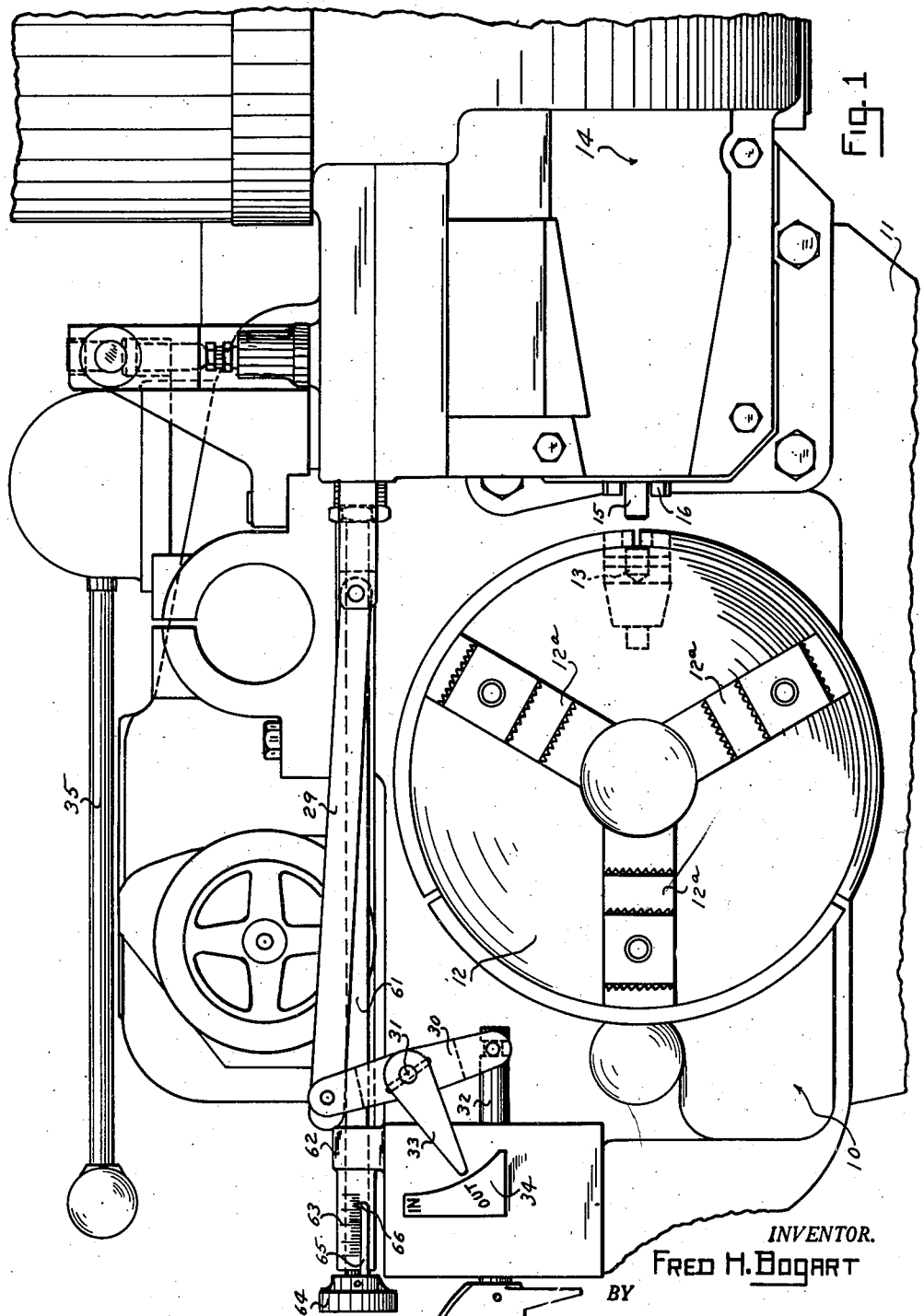
Fig. 1 is a fragmentary end elevational view of the headstock of a machine tool provided with a work gripping chuck and a power operated chuck wrench embodying the present invention.

For the purpose of disclosing one practical embodiment or application of the present invention, but without limiting it thereto, the invention is herein described and illustrated as applied to the driving mechanism for a power operated chuck wrench of a machine tool. Hence, in Fig. 1 of the drawings is shown a machine tool, of a more or less conventional type, comprising a headstock 10 mounted upon a base 11 and provided with the usual chuck 12 which is connected with the work spindle in the conventional manner. This chuck is of the type having mechanism contained therein for actuating the jaws 12a, the mechanism being operated by a rotatable member insertable into a suitably shaped opening 13 of which one or more may be provided at suitably spaced points about the periphery of the chuck, only one being here indicated. This mechanism is conventional and hence need not be described in detail.

Adjacent the chuck 12, and preferably to the rear thereof, as viewed from the front of the machine, i. e., from the left of Fig. 1, there is mounted a power operated chuck wrench unit, generally designated 14, which may be attached to the headstock of the machine tool by any suitable means. This power operated chuck wrench unit comprises a rotatable member or wrench spindle 15, the outer end of which may be polygonally shaped or provided with spaced ears 16 for engagement with correspondingly shaped recesses in an operating member located in the opening 13 of the chuck, the engagement being effected by axially moving the said rotatable member or wrench spindle 15 when the latter is aligned with the opening 13.

The wrench spindle 15 is slidably and rotatably supported within suitable bosses provided in the housing 17 of the chuck wrench unit 14, and a lost motion disk 18 is splined or otherwise slidably connected with a portion of the wrench spindle, the disk being restrained from axial movement with the wrench spindle by any suitable means. As will be seen from Figs. 3 and 5, the wrench member or spindle 15 extends through a collar-like extension 19 of a worm gear 20, the extension 19 being journaled within a suitable cylindrical portion or boss 21 of the housing 17. The inner periphery of the collar portion 19 is provided with an inwardly extending lug 22, which is adapted to cooperate with an outwardly extending lug 23 provided upon the lost motion disk 18, the construction being such that rotation of the worm wheel 20 will effect rotation of the disk 18 and thereby the wrench member 15 when the abutments or extensions 22 and 23 are in engagement. When the worm wheel 20 is rotated in a direction to move the said abutments out of engagement, the said worm wheel may make nearly a complete revolution before again engaging the abutment 23, thereby enabling a relatively sharp blow to be applied to the latter for a purpose hereinafter described.

The wrench spindle 15 is moved axially to and from engagement with the opening 13 in the chuck 12 by means of a toothed segment 24, which is rockably mounted within the housing 17 and has one set of teeth 25 cooperating with a circular rack 26 provided upon the wrench spindle 15. A diametrically opposite toothed portion 27 of member 24 is engaged by the teeth of a rack 28 which is slidable within the housing 17. The rack 28 is pivotally connected by link 29 to one arm of a lever 30 which is pivoted to the headstock at 31, the other arm of lever 30 being pivotally connected with an operating plunger 32 slidably mounted upon a portion of the headstock of the machine tool. The lever 30 is provided with an indicating arm or pointer 33 adapted to rock with the lever and cooperate with plate 34 carrying indicia for indicating the position of the wrench member or spindle relative to the chuck.

Figure 5:
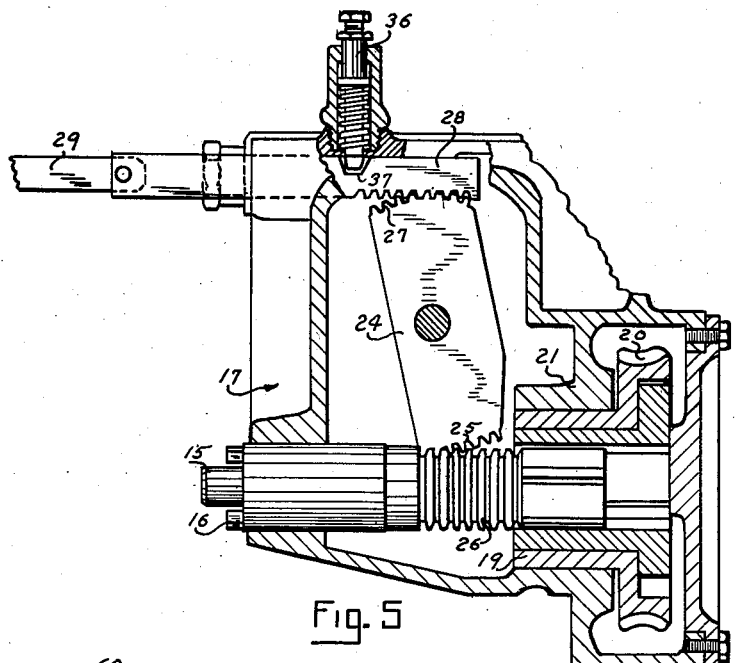
Fig. 5 is a fragmentary view, partly in section and partly in elevation, showing the mechanism for rotating the power operated chuck wrench spindle and for axially moving the latter.

It will be seen that, with the parts positioned as illustrated in Figs. 1 and 5, the handle or plunger 32 is located at its innermost position, and the rack 28 has therefore retracted the wrench portion of spindle 15 from engagement with the chuck. When the handle or plunger 32 is pulled outwardly, the pointer 33 will move to the indicia marked "In" on plate 34, and the rack 28 will rock the toothed member 24 to thereby move the wrench portion of the wrench spindle 15 into engagement with the opening 13 of the chuck. In order that this engagement may not be effected when the chuck spindle and chuck are rotating, an interlock is provided with the main control lever 35 for the headstock mechanism. This interlock comprises a spring pressed plunger 36 positioned to cooperate with a notch 37 in the rack 28, the spring of the plunger 36 normally tending to withdraw the plunger from engagement with the rack, the plunger being held in its depressed position by cooperation with the main control lever 35 when the work spindle and chuck are being rotated, thus preventing actuation of the rack 28.

The wrench spindle 15 of the power wrench mechanism is adapted to be rotated by a reversible electric motor generally designated 38, the armature shaft of which is connected to one set of disk plates or friction members of a friction clutch 39. The other set of disk plates or friction members of the clutch are connected to a movable member 40 of the clutch, which is splined or keyed to a worm shaft 41 journaled in the housing 17. This shaft 41 is provided with a worm 42 which cooperates with the previously mentioned worm wheel 20 for rotating the wrench spindle 15. The clutch herein illustrated and the mechanism about to be described are so constructed that the worm is continuously driven whenever the motor 38 is energized, the clutch disks or friction members being held in continuous engagement under substantially uniform pressure to produce a uniform torque for the wrench spindle even though the friction members of the clutch have become worn. Hence, the jaws of the chuck 12 may be actuated to work-gripping position by a predetermined force, the lost motion connection provided by the disk 18 and the extension collar 19 of worm wheel 20 providing a hammer-like blow for disengaging the chuck jaws from the work gripped therein.

Engagement of the plates of the clutch is effected by a novel mechanism comprising a sleeve-like member 43 which is mounted upon the member 40 for relative rotation therebetween by antifriction means 44, the sleeve member 43 being adapted to be axially moved to apply force to the disks or friction members through the agency of the movable member 40. For effecting this axial movement of the sleeve member 43 its outer surface is provided with two diametrically arranged slots for receiving a pair of shoes 45 which are pivotally carried by the outer ends of a forked arm 46 provided on a pivoted force transmitting member or lever means 47. This member 47 may be variously shaped but is here illustrated as a forked lever pivoted to opposite portions of the housing 17 by bearing pins 48 and 49, respectively. The illustrated member or lever 47 is also provided with an arm 50 extending at an angle with respect to the arm 46, the outer end of arm 50 being preferably bifurcated and provided with a roller 51 rotatably mounted within the spaced portions of the arm. The roller 51 engages a plunger 52, which is slidably positioned within a bore provided in the housing 17, the plunger being forced outwardly of the bore by a force exerting means here illustrated as a coiled main spring 53 having a predetermined length and compressed to a predetermined amount by a plug 54 threaded in the outer end of the bore.

It will be readily understood that the spring 53 will exert a predetermined force upon the arm 50 and thereby rock the force transmitting member or lever 47 to apply a predetermined force through the arm 46, shoes 45, and the intervening mechanism to the friction members or disks of the clutch 39. As the friction members become worn through usage, the member or lever 47 will rock under action of the spring 53 to maintain the friction members in constant engagement. This will result in elongation of the spring 53 and a corresponding reduction in the force exerted thereby. However, in accordance with this invention this reduction in force exerted by the spring is compensated by a corresponding increase in mechanical advantage of the force transmitting members or lever means 47 so that the force exerted upon the clutch 39 remains substantially constant throughout the useful life of the friction members. The manner in which this is effected will be more clearly explained hereinafter.

In order to provide for adjustment of the clutch-engaging pressure through a predetermined range, the force transmitting member or lever means 47 is preferably provided with a third arm 55, the outer end of which is bifurcated and provided with a roller 56. This roller 56 bears against the outer end of a plunger 57 which is slidable within a bore provided in a housing 17 under the influence of a variable force exerting means. This bore is here shown as extending substantially parallel with the previously mentioned bore for the plunger 52. The outer end of the bore for the plunger 57 is threaded and screwed therein is a hollow plug 58 which is both internally and externally threaded. The internal threads of the plug cooperate with external threads upon a headed member 59 disposed within the bore and forming an abutment for the inner end of a force exerting means which may comprise a coil spring 60 surrounding a reduced portion of the plunger 57, the outer end of the spring exerting a force against the headed portion of the plunger.

Figure 4:
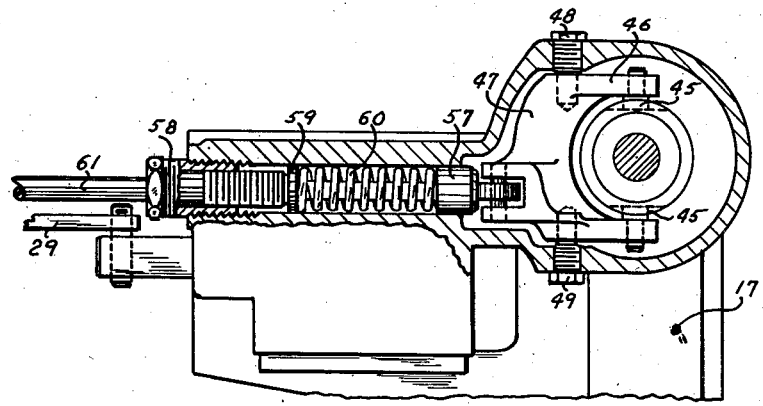
Fig. 4 is a sectional view taken substantially on the line 4—4 of Fig. 2.

A calibrated adjustment operating means may be provided for rotating the member 59. Such an operating means is illustrated in Figs. 1 and 4 as comprising a rod 61 formed integral with the member 59, the rod extending forwardly of the headstock, the outer end thereof projecting through a suitable boss or bracket 62 carried by the headstock 10 and provided with indicia 63. This outer end of the rod 61 is preferably provided with a knurled knob 64 which has an elongated extension 65 provided with an arrow or pointer 66 for cooperation with the indicia 63. When the knob 64 is rotated, the rod 61 will cause the member 59 to move axially relative to the plug 58 thereby varying the compression upon the spring 60 and hence the force exerted through the plunger 57 upon the arm 55. This force will act in opposition to that exerted by the spring 53, the difference between the two forces being the force which is effective for holding the friction members of the clutch in engagement, this value being indicated by the position of the pointer 66 upon the indicia 63.

The indicia 63 may be of any desired type representative of either the clutch-engaging pressures or the gripping pressures exerted by the jaws of the chuck 12 upon the stock or workpiece placed therein, this latter pressure being directly related to the clutch-engaging pressure. This relationship will be readily understood by observing that when the member 59 is rotated the pressure applied by the arm 46 to the clutch 39, for holding it in engagement, is correspondingly varied. For a given position of member 59 the corresponding clutch-engaging pressure will permit the chuck wrench spindle 15 to tighten the chuck only until the pressure exerted thereby upon the workpiece balances the torque transmitted by the clutch 39. When this work-gripping pressure has been reached, the clutch 39 will slip and hence the work-gripping pressure of the chuck may be selected or predetermined by the amount of the adjustment of member 59. Therefore, the calibrations or indicia 63 may be, and preferably are, expressed directly in terms of work-gripping pressures.

As stated above, the improved mechanism operates to maintain any selected clutch-engaging pressure substantially constant even though the thickness of the friction members of the clutch is reduced by wear. The manner in which this is effected can be more readily understood with reference to Fig. 6, which is a diagrammatic representation of the force transmitting member or lever 47 and the operating principles thereof; the full lines of the figure representing the position of this member or lever when the friction members of the clutch operated thereby are new, and the dotted lines representing the location of the member or lever when the friction members of the clutch have worn to a point requiring replacement. As will be seen from the figure, the member or lever 47 is pivoted for rocking about a point located at the intersection of the three diagrammatically represented arms 46, 50 and 55, this pivot being provided in the preferred form of the apparatus by the bearing pins 48 and 49. The line of action of the force applied by the standard or main spring 53 upon the arm 50 is represented by the arrow designated 67, and the line of action of the corresponding clutch-engaging pressure, which is transmitted to the clutch by the arm 46, is represented by the arrow 68. Likewise, the line of action of the force exerted upon the arm 55 by the reaction spring 60, for adjusting the effective pressure exerted upon the clutch, is represented by the arrow 69.

It will be seen that when the friction members of the clutch are new, the arm 46 of the member or lever 47 is preferably disposed at a slight angle to a straight line passing through the pivot of the lever 47 and parallel with the lines of action 67 and 69 of springs 53 and 60. The length of the arm 46 and the amount of this angle are so chosen that when the friction members of the clutch are substantially worn out the said arm will be disposed upon the other side of the above-mentioned straight line and forming an angle therewith substantially equal to the initial angle. Hence, the effective lever arm of the force represented by the arrow 68 may be considered as remaining substantially constant throughout the operation of the device, since the arcuate movement of the outer end of the arm 46 is substantially a straight line movement.

The arms 50 and 55 of the member or lever 47 are preferably substantially equal in length and are each disposed at an angle with respect to the aforementioned straight line and with respect to the arm 46. The lengths of the arms 50 and 55 relative to the arm 46 are preferably such that the forces exerted thereon are transmitted with a mechanical advantage. That is to say, the effective lever arms corresponding to the physical arms 50 and 55 of the lever are greater than the effective lever arm corresponding to the physical arm 46; the effective lever arm being defined as the perpendicular distance between the pivot of a lever and the line of action of the force acting upon the corresponding physical arm of the lever. Thus, the effective lever arm of the physical arm 50 when the friction members of the clutch are new, is represented by the length of the dot-dash arrow 70 extending perpendicularly with respect to the line of force 68 of the standard or main spring 53. Also, the effective lever arm of the physical arm 55 when the friction members of the clutch are new is represented by the length of the dot-dash arrow 71 extending perpendicularly with respect to the line of action 69 of the force exerted by the reaction spring 60. Likewise, the effective lever arm of the physical arm 46 is represented by the length of the dot-dash arrow 72 extending perpendicularly with respect to the line of action 68 of the transmitted force which effects clutch engagement. This last-mentioned effective lever arm corresponding to the aforementioned substantially straight line, extending through the center of the rocking motion of lever 47 perpendicularly to the arrow 68, and remains substantially constant throughout the rocking of the lever as the friction members of the clutch wear.

Figure 6:
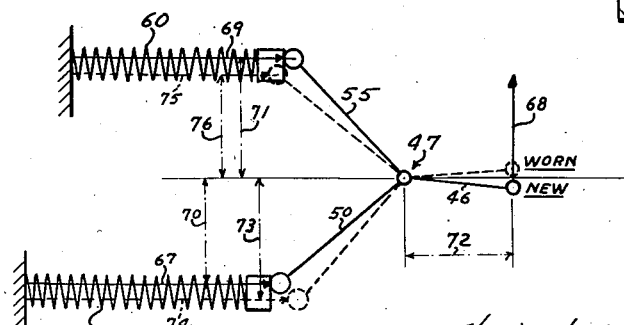
Fig. 6 is a diagrammatic representation of the physical principles employed in this invention.

Assuming that the friction members of the clutch have now worn substantially the entire safe amount prior to replacing, the lever 47 will have rocked to the position indicated by the dotted lines in Fig. 6 as a result of this wear. Throughout this rocking motion, the pressure exerted by the arm 46 upon the clutch will remain substantially constant since, although the force of the main spring 53 decreases due to elongation as the lever rocks, the mechanical advantage of the lever has correspondingly increased. This increased mechanical advantage results from an increase in the effective lever arm of the arm 50, while the effective lever arm of the arm 46 has remained substantially constant. This increased effective lever arm for the arm 50 is represented in Fig. 6 by the length of dot-dash arrow 73, whereas the effective leverage arm of arm 46 remains as indicated at 72. The construction of the preferred embodiment of the invention permits this action, since the said force of the spring 53 is applied through a plunger 52 cooperating with the roller 51 on the arm 50, the roller moving over the face of the plunger as the lever rocks, so that the direction of the force exerted by the spring remains constant, although its effective line of action may be considered as having shifted to the position indicated by the arrow 74. The lengths of the arms 50 and 46 of the lever and the angle therebetween are so selected that the resulting increased mechanical advantage will exactly compensate for the decreased force exerted by the spring; that is to say, the force of the spring multiplied by the mechanical advantage of the effective lever arms remains substantially constant throughout the useful life of the friction members of the clutch.

As the lever 47 rocks, as above mentioned, resulting from wear of the friction members of the clutch, the roller 56 on the end of the arm 55 will likewise move over the end of the plunger 57 further compressing the reaction spring 60. The force exerted by this reaction spring 60 continues to act in the same direction but may be considered to have shifted its line of action from the position indicated by the arrow 69 to the position indicated by the arrow 75, correspondingly decreasing the effective lever arm of arm 55 to a value as indicated by the dot-dash arrow 76. The length of the arm 55 relative to that of arm 46 and the angle therebetween are so chosen that the mechanical advantage thereof decreases as the result of this rocking motion, and this decreased mechanical advantage compensates for the increased force exerted by the reaction spring 60 due to the latter being further compressed. In other words, for given adjustment of member 59 the resulting force exerted by the spring 60 multiplied by the mechanical advantage of the lever, for any position of the latter, remains substantially constant.

As explained above, the force of the spring 60 acts in opposition to the force exerted by the spring 53, the member 59 being adjusted so that the resulting force exerted by the arm 46 is of such a value as to effect engagement of the clutch with a predetermined pressure. Therefore, the clutch transmits a substantially constant torque of selected value for actuating the wrench spindle so that the latter operates the jaws of the chuck 12 to provide a predetermined work-gripping pressure, the clutch slipping after this work-gripping pressure has been applied. In other words, when the knob 64 has been adjusted to align the pointer or arrow 66 with a selected calibration 63 corresponding to a desired pressure of the chuck jaws, the jaws will be actuated by the wrench spindle 15 to exert this work-gripping pressure each time the wrench spindle is engaged with the chuck and this pressure will always be substantially the same until the knob 64 is adjusted to a new setting. The wear of the friction members of the clutch does not alter the indicated work-gripping pressure since the consequent rocking of the lever 47, increasing and decreasing respectively the effective lever arms of the arms 50 and 55, compensates for the corresponding decrease and increase of the forces exerted by the springs 53 and 60.

The force transmitting member or lever means 47 has been illustrated as having the arms 50 and 55 thereof of substantially the same length and shorter than the arm 46. Likewise, the angles between arms 55 and 46, and between arms 50 and 46 have been illustrated as being substantially equal. It will be apparent, however, that these values of the lengths of the lever arms and their angular relationships are not critical and may be varied. It is only necessary that: the product of the force applied to the arm 50 by the effective lever arm thereof remain substantially constant for all positions of the arm; that the product of the force applied to the arm 55 by the effective lever arm thereof remain substantially constant throughout the entire range of movement of the arm; and that the position and length of arm 46 should be so chosen that its effective lever arm does not materially change throughout the range of movement of the arm.

While the present preferred embodiment of the invention has been disclosed in combination with a power operated chuck wrench for machine tools, the invention is not to be considered as limited to such a use since it is of general utility for effecting transmission of a substantially constant preselected torque from a driving to a driven member. Furthermore, the invention is not restricted to the exact details of construction and arrangement of parts as illustrated and described, but is limited only as required by the spirit and scope of the appended claims.

Having thus described my invention, I claim:

1. In a machine tool having a chuck and power driven means including a friction clutch for actuating the jaws of the chuck, the improvement which comprises automatic means for maintaining said friction clutch engaged with a substantially constant pressure throughout the useful life of the friction members of said clutch including means to exert a clutch-engaging force and means to transmit said force to said clutch with a mechanical advantage, the force exerting means and the force transmitting means being so constructed and arranged that the mechanical advantage of the latter increases as the force exerted by the former decreases due to wear of the friction members of said clutch, whereby the clutch-engaging pressure remains substantially constant so that the clutch transmits a substantially constant torque for actuating the jaws of the chuck and slips when said torque is exceeded.

2. In a machine tool having a chuck and power driven means including a friction clutch for actuating the jaws of the chuck, the improvement which comprises automatic means for maintaining said friction clutch engaged with a substantially constant pressure throughout the useful life of the friction members of said clutch including means to exert a clutch-engaging force and pivoted lever means to transmit said force to said clutch with a mechanical advantage, the force exerting means and the lever means being so constructed and arranged that the perpendicular distance between the pivot of said lever means and the line of action of the force exerting means increases as the force exerted decreases due to wear of the friction members of said clutch, whereby the clutch-engaging pressure remains substantially constant so that the clutch transmits a substantially constant torque for actuating the jaws of the chuck and slips when said torque is exceeded.

3. In a machine tool having a chuck and power driven means including a friction clutch for tightening the jaws of the chuck, the improvement which comprises automatic means for maintaining said friction clutch engaged with a substantially constant pressure throughout the useful life of the friction members of said clutch including a compression spring for exerting a clutch-engaging force and pivoted lever means to transmit said force to said clutch with a mechanical advantage, the spring and the lever means being operatively associated in a manner such that the perpendicular distance between the pivot of the latter and the line of action of the force exerted by the former increases as the said force decreases due to expansion of the spring resulting from wear of the friction members of said clutch, whereby the clutch-engaging pressure remains substantially constant so that the clutch is effective to transmit a substantially constant torque for actuating the jaws of the chuck and slips when said torque is exceeded.

4. In a machine tool having a chuck and power driven means including a friction clutch for tightening the jaws of the chuck, the improvement which comprises automatic means for maintaining said friction clutch engaged with a substantially constant predetermined pressure including means to exert a clutch-engaging force, means to transmit said force to said clutch with a mechanical advantage, and adjustable means to oppose a selected amount of the force of said force exerting means to provide a range of predetermined clutch-engaging pressures, the force exerting means and the force transmitting means being so constructed and arranged that the mechanical advantage of the latter increases as the force exerted by the former decreases due to the wear of the friction members of said clutch whereby the pre-determined clutch-engaging pressure remains substantially constant so that the clutch is effective to transmit a corresponding substantially constant predetermined torque for actuating the jaws of the chuck and slips when said torque is exceeded.

5. In a machine tool having a chuck and power driven means including a friction clutch for tightening the jaws of the chuck, the improvement which comprises automatic means for maintaining said friction clutch engaged with a substantially constant predetermined pressure including means to exert a clutch-engaging force, means to transmit said force to said clutch with a mechanical advantage, and means for exerting an adjustable force upon said transmitting means to oppose a selected amount of the force of said first-mentioned force-exerting means thereby providing a range of predetermined clutch-engaging pressures, both of said force exerting means coacting with the force transmitting means in a manner such that the respective products of the mechanical advantages of the latter and the forces exerted by each of the former remain substantially constant for any selected value of said adjustable force throughout the useful life of the friction members of the clutch, whereby the predetermined clutch-engaging pressure remains substantially constant so that the clutch is effective to transmit a corresponding substantially constant predetermined torque for actuating the jaws of the chuck and slips when said torque is exceeded.

6. In an apparatus of the character described including a supporting housing and a friction clutch disposed within said housing, the said friction clutch comprising interengageable driving and driven friction members rotatable relative to said housing; the improvement which comprises a lever of the bell crank type including a force arm and a clutch actuating arm extending at an angle with respect to each other, pivot means pivotally supporting said lever on said housing intermediate said arms with the said actuating arm extending transversely of the axes of said friction members, means operatively connecting the clutch actuating arm with said clutch to effect engagement of said friction members, and means supported by said housing and exerting a substantially linear force on said force arm in a direction approximately parallel to the said actuating arm.

7. A friction clutch for transmitting a predetermined torque from a driving to a driven means, the said clutch comprising interengageable friction members operatively connected to said driving and driven means respectively, and means for holding said friction members engaged with a selected predetermined pressure, said last-mentioned means including a pivoted three-arm lever, means operatively connecting one arm of said lever with one of said friction members for moving the latter into engagement with the other of said friction members, means for exerting force upon a second arm of said lever to continuously urge said first arm in a clutch-engaging direction, and means for exerting an adjustable force on a third arm of said lever in a direction tending to urge said first arm in the opposite direction whereby the resulting clutch-engaging force exerted by said first arm of said lever may be adjusted to a predetermined value within a given range.

8. A friction clutch for transmitting a predetermined torque from a driving to a driven means, the said clutch comprising interengaging friction members operatively connected to said driving and driven means respectively, and means for holding said friction members engaged, said last mentioned means including a pivoted three-arm lever, means operatively connecting one arm of said lever with one of said friction members for moving the latter into engagement with the other of said friction members, a compression spring adapted to exert force upon a second arm of said lever to continuously urge said first arm in a clutch-engaging direction, a second compression spring for exerting a force upon the third arm of said lever in a direction tending to urge said first arm in the opposite direction, and means for adjusting the compression of said second mentioned spring whereby the resulting clutch-engaging force exerted by said first arm of said lever may be adjusted to a predetermined value within a given range.

9. A friction clutch for transmitting a predetermined torque from a driving to a driven means, the said clutch comprising interengageable friction members operatively connected to said driving and driven means respectively, and means for holding said friction members engaged including a pivoted three-arm lever, means operatively connecting one arm of said lever with one of said friction members for moving the latter into engagement with the other of said friction members, a compression spring for exerting a force upon a second arm of said lever to continuously urge said first arm in clutch engaging direction, a second compression spring adapted to exert a force on the third arm of said lever in a direction tending to urge said first arm in the opposite direction, said second and third arms each being provided with a roller adjacent the outer ends thereof and the lever engaging ends of said compression springs each being provided with members having planar faces for engaging said rollers, and means to adjust the compression of said second mentioned spring to thereby adjust the clutch-engaging force exerted by said first arm.

10. A friction clutch for transmitting a substantially constant predetermined torque from a driving to a driven means, the said clutch comprising interengageable friction members operatively connected to said driving and driven means respectively, and means for holding said friction members engaged with a substantially constant predetermined pressure, said last-mentioned means including a pivoted three-arm lever, means operatively connecting one arm of said lever with one of said friction members for moving the latter into engagement with the other of said friction members, means for exerting a force upon a second arm of said lever for continuously urging said first arm in a clutch-engaging direction, means for exerting an adjustable force on the third arm of said lever in a direction tending to urge said first arm in the opposite direction, the lever and said force exerting means being so constructed and arranged that when the former rocks about its pivot due to wear of said friction members the effective lever arm of said second arm increases as the force exerted thereon decreases and the effective lever arm of the third arm decreases as the force exerted thereon increases, whereby the product of each of said forces by its effective lever arm remains substantially constant for any selected value of said adjustable force so that the friction members of the clutch are held in engagement with a substantially constant predetermined pressure.

11. A friction clutch for transmitting a substantially constant predetermined torque from a driving to a driven means, the said clutch comprising interengageable friction members operatively connected to said driving and driven means respectively, and means for holding said friction members engaged with a substantially constant predetermined pressure, said last-mentioned means including a pivoted three-arm lever, means operatively connecting one arm of said lever with one of said friction members for moving the latter into engagement with the other of said friction members, a main spring for exerting force upon a second arm of said lever for continuously urging said first arm in a clutch-engaging direction, a reaction spring for exerting force on the third arm of said lever in a direction tending to urge said first arm in the opposite direction, means to adjust the force of said reaction spring to thereby adjust the resulting clutch-engaging force exerted by said first arm of said lever to a predetermined value, the said lever and springs being so constructed and arranged that as the lever rocks due to wear of said friction members resulting alterations in the forces exerted by said springs are compensated by an inverse change in the effective lever arms of the said second and third arms of said lever, whereby the resulting clutch-engaging pressure remains substantially constant at the value determined by the adjustment of said reaction spring.

12. A friction clutch of the type defined in claim 11 and in which said springs are compression springs each provided with a means having a planar surface, and said second and third lever arms are each provided with rollers engaging said planar surfaces, whereby the said rollers remain in contact with said surfaces for all positions of the lever as the latter rocks due to wear of said friction members.

13. In a machine tool of the type described having a chuck provided with movable work-engaging jaws, a wrench spindle adapted to operatively engage a portion of said chuck to move said jaws to and from work-gripping position, reversible power driving means, and operative connections including a friction clutch having interengaging friction members between said power means and said wrench spindle for rotating the latter to move said jaws; the improvement which comprises means for holding said friction members engaged with a substantially constant predetermined pressure including a pivoted three-arm lever, means operatively connecting one arm of said lever with one of said friction members, means for exerting a force upon a second arm of said lever to urge said first arm in a clutch-engaging direction, means for exerting an adjustable force on the third arm of said lever in a direction tending to urge said first arm in the opposite direction, the lever and the force exerting means being so constructed and arranged that when the former rocks about its pivot due to wear of said friction members the effective lever arm of said second arm increases as the force exerted thereon decreases and the effective lever arm of the third arm decreases as the force exerted thereon increases, whereby the product of each of said forces by its effective lever arm remains substantially constant for any selected value of said adjustable force so that a range of substantially constant torques are provided for said wrench spindle.

FRED H. BOGART.

REFERENCES CITED

The following references are of record in the file of this patent:

UNITED STATES PATENTS

| Number | Name | Date |
|---|---|---|
| 1,195,286 | Snyder | Aug. 22, 1916 |
| 1,448,861 | Pearson | Mar. 20, 1923 |
| 1,698,254 | Bullard, Jr. | Jan. 8, 1929 |
| 1,831,225 | Bogart | Nov. 10, 1931 |
| 2,137,998 | Bronander | Nov. 29, 1938 |